US008999580B2

(12) United States Patent
Sotowa et al.

(10) Patent No.: US 8,999,580 B2
(45) Date of Patent: Apr. 7, 2015

(54) COMPOSITE GRAPHITE PARTICLES AND LITHIUM RECHARGEABLE BATTERY USING THE SAME

(75) Inventors: Chiaki Sotowa, Tokyo (JP); Masataka Takeuchi, Tokyo (JP)

(73) Assignee: Show A Denko K.K., Tokyo (JP)

( * ) Notice: Subject to any disclaimer, the term of this patent is extended or adjusted under 35 U.S.C. 154(b) by 1164 days.

(21) Appl. No.: 12/097,001

(22) PCT Filed: Dec. 20, 2006

(86) PCT No.: PCT/JP2006/325378
§ 371 (c)(1),
(2), (4) Date: Jun. 11, 2008

(87) PCT Pub. No.: WO2007/072858
PCT Pub. Date: Jun. 28, 2007

(65) Prior Publication Data
US 2009/0202917 A1  Aug. 13, 2009

Related U.S. Application Data

(60) Provisional application No. 60/754,890, filed on Dec. 30, 2005.

(30) Foreign Application Priority Data

Dec. 21, 2005  (JP) .................................. 2005-367910

(51) Int. Cl.
| H01M 4/13 | (2010.01) |
| H01M 4/58 | (2010.01) |
| H01M 10/0525 | (2010.01) |
| H01M 4/133 | (2010.01) |
| H01M 4/587 | (2010.01) |
| H01M 10/0569 | (2010.01) |
| H01M 4/02 | (2006.01) |

(52) U.S. Cl.
CPC .......... H01M 10/0525 (2013.01); H01M 4/133 (2013.01); H01M 4/587 (2013.01); H01M 10/0569 (2013.01); H01M 2004/021 (2013.01); Y02E 60/122 (2013.01); Y02T 10/7011 (2013.01)

(58) Field of Classification Search
CPC . H01M 10/0525; H01M 4/133; H01M 4/587; H01M 10/0569; H01M 2004/021; Y02E 60/122; Y02T 10/7011
USPC ................ 429/521, 209, 218.1, 231.4, 231.7, 429/231.8; 428/403; 423/448
See application file for complete search history.

(56) References Cited

U.S. PATENT DOCUMENTS

| 6,632,569 | B1 * | 10/2003 | Kameda et al. ............ 429/231.8 |
| 2002/0061445 | A1 | 5/2002 | Kitagawa et al. |
| 2002/0076614 | A1 | 6/2002 | Yoon et al. |
| 2003/0152835 | A1 | 8/2003 | Dasgupta et al. |
| 2004/0151837 | A1 | 8/2004 | Morita et al. |
| 2004/0227264 | A1 * | 11/2004 | Zou et al. .......................... 264/7 |
| 2004/0248010 | A1 * | 12/2004 | Kato et al. ................ 429/231.8 |
| 2006/0133980 | A1 | 6/2006 | Nanba et al. |
| 2007/0092428 | A1 | 4/2007 | Sotowa et al. |

FOREIGN PATENT DOCUMENTS

| EP | 0 917 228 A1 | 5/1999 | |
| EP | 1 005 097 A1 | 5/2000 | |
| JP | 11-054123 A | 2/1999 | |
| JP | 11-329436 A | 11/1999 | |
| JP | 2000-340232 A | 12/2000 | |
| JP | 2000-357516 A | 12/2000 | |
| JP | 3193342 B2 | 5/2001 | |
| JP | 2001-185147 A | 7/2001 | |
| JP | 2002-237303 A | 8/2002 | |
| JP | 2002-348109 A | 12/2002 | |
| JP | 2003-142092 A | 5/2003 | |
| JP | 2004-210634 A | 7/2004 | |
| JP | 2005-004974 A | 1/2005 | |
| JP | 2005-019397 A | 1/2005 | |
| JP | 2005-097010 A | 4/2005 | |
| JP | 2005-158718 A | 6/2005 | |
| JP | 2006-528407 A | 12/2006 | |
| WO | 2004/056703 A1 | 7/2004 | |
| WO | WO 2004109825 A2 * | 12/2004 | .............. H01M 4/58 |
| WO | 2005/008810 A1 | 1/2005 | |
| WO | WO 2010/100764 A1 | 9/2010 | |

* cited by examiner

*Primary Examiner* — Carlos Barcena
(74) *Attorney, Agent, or Firm* — Sughrue Mion, PLLC

(57) ABSTRACT

The invention provides composite graphite particles, comprising a core material consisting of graphite having a interlayer distance d(002) of 0.337 nm or less and a surface layer consisting of graphite in which the intensity ratio $I_D/I_G$ (R value) between the peak intensities ($I_D$) in a range of 1300 to 1400 $cm^{-1}$ and ($I_G$) in a range of 1580 to 1620 $cm^{-1}$ as measured by Raman scattering spectroscopy is 0.3 or higher, wherein the peak intensity ratio $I_{110}/I_{004}$ between the peak intensities ($I_{110}$) of face (110) and ($I_{004}$) of face (004) obtained by XRD measurement on the graphite crystal is 0.15 or higher when the graphite has been mixed with a binder and pressure-molded to a density of 1.55 to 1.65 $g/cm^3$, which composite graphite particles are useful in a secondary battery negative electrode having a high capacity, high charge/discharge characteristics and an excellent charging property, and also provides a paste for negative electrode, a negative electrode and a lithium secondary battery using the composite graphite.

12 Claims, No Drawings

COMPOSITE GRAPHITE PARTICLES AND LITHIUM RECHARGEABLE BATTERY USING THE SAME

CROSS-REFERENCE TO THE RELATED APPLICATIONS

This application is a National Stage of International Application No. PCT/JP2006/325378 filed Dec. 20, 2006, claiming the benefit of U.S. Provisional Application Ser. No. 60/754,890 filed Dec. 30, 2005, under the provision of 35 U.S.C. Section 111(b), pursuant to 35 U.S.C. Section 119(e)(1).

TECHNICAL FIELD

The present invention relates to composite graphite particles and uses thereof. More specifically, it relates to composite graphite particles, which are useful as an active material for negative electrode in a second battery having good lithium acceptability (charge characteristics) when quick charging is conducted, having a large discharge capacity, and excellent in charge-discharge cycle characteristics, and to a paste for negative electrode, a negative electrode and a lithium secondary battery which use the composite graphite particles.

BACKGROUND ART

As power source for portable apparatuses and the like, lithium secondary batteries are mainly used. As functions of portable apparatuses and the like become more and more diversified, power consumption of each apparatus is on the increase. Further, such an apparatus is required to have quick-charge characteristics. Therefore, a lithium secondary battery is required to have an increased battery capacity and at the same time an improved charge-discharge cycle characteristics, and furthermore to have an enhanced quick-charging property.

In such a lithium secondary battery, generally, lithium-containing metal oxide such as lithium cobaltate is used as cathode active material and carbonaceous material such as graphite is used as anode active material.

Carbonaceous materials can be roughly categorized into graphite material with a high crystallinity degree and amorphous carbon material with a low crystallinity degree. Both types, which allow lithium insertion/elimination reaction, can be used as anode active material.

Amorphous carbon material is known to have a good charge characteristics while it has a disadvantage of significant cycle deterioration. On the other hand, highly crystalline graphite material has a stable cycle characteristics while its charge characteristics is inferior to that of amorphous carbon material. Currently, graphite materials having stable cycle characteristics are widely used as negative electrode material.

Various techniques have been proposed to achieve a high battery capacity, good cycle characteristics and charge characteristics in graphite material serving as anode active material.

For example, Patent Document 1 discloses a method for obtaining a graphite material, where fine particles with a low volatile matter content which have been obtained by thermally treating a coal-based pitch containing 1.0% or less of free carbon and pulverizing followed by classification, are mixed with fine particles with a high volatile matter content which have been obtained by thermally treating a coal-based pitch to prepare a thermal decomposition product having a softening point of 320 to 380° C., pulverizing the thermal decomposition product, classifying it and non-solubilizing it, and then the mixture is subjected to calcination to be graphitized to thereby obtain a graphite material (Comparative Example 1 described later).

Patent Document 2 describes about massive-form graphite particles consisting of scaly natural graphite particles and proposes controlling D-50% in the particle size distribution to be 10 to 25 μm, specific surface area to be 2.5 to 5 $m^2/g$ and particulate bulk density to be in a predetermined range (Comparative Example 2 described later.)

Patent Document 3 discloses about coating the surface of graphite powder with a carbon precursor and calcinating it in an inert gas atmosphere at a temperature range of 700 to 2800° C. (Comparative Example 3 described later).

Further, Patent Document 4 discloses using composite graphite particles as an anode active material, which is obtained by granulating a scaly graphite having d(002) of 0.3356 nm, R value of around 0.07 and Lc of about 50 nm by use of an external mechanical force to thereby prepare spheroidized graphite particles and coating the particles with a carbide obtained by heating a resin such as phenol resin. The document teaches that the composite graphite particles are obtained by carbonizing in a nitrogen atmosphere preliminarily at 1000° C. and then at 3000° C. (Comparative Example 4 described later).

These conventional graphite materials all exhibit a high battery capacity. The cycle characteristics of these materials, except for the case of Patent Document 1, however, are insufficient. Moreover, charge characteristics in the materials are all low.

[Patent Document 1]Japanese Patent Application Laid-Open No. 2003-142092
[Patent Document 2]Japanese Patent Application Laid-Open No.2002-237303
[Patent Document 3]Japanese Patent No. 3193342 (European Patent No. 917228)
[Patent Document 4]Japanese Patent Application Laid-Open No.2004-210634 (WO2004/056703 pamphlet)

DISCLOSURE OF THE INVENTION

Problems to be Solved by the Invention

The object of the present invention is to provide a composite graphite useful for negative electrode in a secondary battery showing a high battery capacity, having good charge-discharge cycle characteristics and having excellent charge characteristics, and a paste for negative electrode, a negative electrode and a lithium secondary battery which use the composite graphite.

Means for Solving Problem

As a result of studies with a view to achieving the above object, the present inventors have found out that a secondary battery having a high battery capacity, good charge-discharge cycle characteristics and good charge characteristics can be obtained by using as anode active material a composite graphite comprising a core material consisting of graphite having a specific interlayer distance and a surface layer which is a low-crystallinity carbon whose R value obtained by Raman scattering spectroscopy is higher than a predetermined value. Based on this finding, they have completed the present invention.

That is, the present invention provides composite graphite particles having the following composition and uses thereof.

[1] Composite graphite particles, comprising a core material consisting of graphite having a interlayer distance d(002) of 0.337 nm or less and a surface layer consisting of graphite in which the intensity ratio $I_D/I_G$ (R value) between the peak intensity ($I_D$) in a range of 1300 to 1400 $cm^{-1}$ and the peak intensity ($I_G$) in a range of 1580 to 1620 $cm^{-1}$ as measured by Raman scattering spectroscopy is 0.3 or higher, wherein the peak intensity ratio $I_{110}/I_{004}$ between the peak intensity ($I_{110}$) of face (110) and the peak intensity ($I_{004}$) Of face (004) obtained by XRD measurement on the graphite crystal is 0.15 or higher when the graphite has been mixed with a binder and pressure-molded to a density of 1.55 to 1.65 $g/cm^3$.

[2] The composite graphite particles according to 1, comprising vapor-grown carbon fiber attached on the surface layer.

[3] The composite graphite particles according to 1 or 2, wherein the crystallite diameter in the c-axis direction Lc of the core material graphite is 100 nm or more.

[4] The composite graphite particles according to any one of 1 to 3, wherein the core material graphite is a natural graphite.

[5] The composite graphite particles according to any one of 1 to 4, wherein in particle size distribution measurement by laser diffraction method, the particle size of 90% or more of the total core material is within a range of 5 to 50 μm.

[6] The composite graphite particles according to any one of 1 to 5, wherein the BET specific surface area is in a range of 0.5 to 30 $m^2/g$.

[7] The composite graphite particles according to any one of 1 to 6, wherein the interlayer distance d(002) is 0.337 nm or less and the crystallite diameter in the c-axis direction Lc is 100 nm or more.

[8] The composite graphite particles according to any one of 1 to 7, wherein in particle size distribution measurement by laser diffraction method, the particle size of 90% or more of the particles is within a range of 5 to 50 um.

[9] The composite graphite particles according to any one of 1 to 8, wherein the surface layer graphite is obtained by thermally treating an organic compound at a temperature of 1000 to 2700° C.

[10] The composite graphite particles according to 9, wherein the organic compound is at least one selected from a group consisting of phenol resin, polyvinylalcohol resin, furan resin, cellulose resin, polystyrene resin, polyimide resin and epoxy resin.

[11] The composite graphite particles according to 9 or 10, wherein the coating amount of the organic compound serving as raw material for the surface layer is in a range of 15 to 30% by mass based on the core material.

[12] A method for producing the composite graphite particles described in any one of 1 to 11, comprising a step of allowing an organic compound to attach to the surface of the core material consisting of a graphite having an interlayer distance d(002) of 0.337 nm or less, a step of polymerizing the organic compound at 200 to 400° C. and a step of conducting a thermal treatment at a temperature of 1000 to 2700° C.

[13] A paste for negative electrode, comprising the composite graphite particles described in any one of 1 to 11, a binder and a solvent.

[14] A negative electrode, which is obtained by spreading the paste for negative electrode described in 13 on a collector, drying and pressure-molding it.

[15] A lithium secondary battery comprising the negative electrode described in 14 as a constituent.

[16] The lithium secondary battery according to 15, using a nonaqueous electrolytic solution and/or nonaqueous polymer electrolyte, wherein the nonaqueous electrolytic solution and/or nonaqueous polymer contains at least one nonaqueous solvent selected from a group consisting of ethylene carbonate, diethylene carbonate, dimethyl carbonate, methyl ethyl carbonate, propylene carbonate, butylene carbonate, γ-butyrolactone and vinylene carbonate.

Effect of the Invention

The composite graphite particles of the present invention realize a high battery capacity, reduction in deterioration of cycle characteristics, and high lithium acceptability. Therefore, the present invention is useful as active material for anode active material in a lithium secondary battery having a high battery capacity and good cycle characteristics, which can be quickly charged.

BEST MODE FOR CARRYING OUT THE INVENTION

Hereinafter, the present invention will be explained in greater detail.

(Composite Graphite)

The composite graphite particles of the present invention, which is useful as an anode active material, comprises a core material consisting of a graphite and a surface layer consisting of a graphite.

The graphite used as the core material constituting the composite graphite particles of the present invention has an interlayer distance (d) for 002 face, d(002) of 0.337 nm or less, preferably, 0.336 nm or less. A preferred graphite used as the core material has a crystallite diameter in the c-axis direction, Lc of 100 nm or more. These d value and Lc are measured by powder X-ray diffraction.

A preferred graphite particle used as the core material has core material has a BET specific surface area of 1 to 10 $m^2/g$, preferably 1 to 7 $m^2/g$.

Examples of graphite used as the core material include artificial graphite and natural graphite. Preferred is natural graphite. Generally, a graphite has a scaly shape. Therefore, graphite crystals have anisotropic nature. If graphite having anisotropic nature is used as is, graphite crystals are sometimes oriented in parallel to the electrode surface to thereby give the electrode anisotropic nature. In the present invention, as the core material constituting the composite graphite, a graphite obtained by granulating a natural or artificial graphite and spheriodizing it is suitably used.

Granulation of graphite can be conducted by known method. For example, natural graphite powder is first pulverized to prepare fine particles. Then, the fine graphite particles are granulated while spraying a binder or the like to the particles. Examples of binder used here include pitch and various resins such as phenol resin. The preferable amount of the binder used here is from 10 to 30 parts by mass based on 100 parts by mass of graphite. There is no limitation on apparatuses used for the pulverization and granulation. Alternatively, granulation can be conducted by using an apparatus such as hybridizer manufactured by NARA MACHINERY CO., LTD. and applying a mechanical strong force onto natural graphite, without using a binder. Through such a granulation process, graphite crystals become oriented in various directions and anisotropic nature decreases.

The average particle size of the core material is preferably from 5 to 50 μm, more preferably 5 to 40 μm. When there are many fine particles, it is difficult to increase the electrode density. When there are many large-size particles, unevenness in coating is caused at the step of spreading an electrode slurry, which leads to significant deterioration in battery characteristics. In consideration for this, it is preferable that 90% or more of the total graphite particles used as the core material have a particle size of a range of 5 to 50 μm. The particle size of the composite graphite particles of the present invention is almost the same as the particle size of the core material particle size. Even if a surface layer is provided on the particles, the increase in the particle size is within several tens of nanometers at most. It is preferable that the average particle size of the composite graphite particles be in a range of 5 to 50 μm as well.

Also, it is preferable that the core material used in the present invention have an R value smaller than that of the graphite used in the surface layer.

The surface layer constituting the composite graphite particles of the present invention consists of carbon in which the intensity ratio $I_D/I_G$ (R value) between the peak intensity ($I_D$) in a range of 1300 to 1400 $cm^{-1}$ and the peak intensity ($I_G$) in a range of 1580 to 1620 $cm^{-1}$ as measured by Raman spectroscopy spectra is 0.30 or higher, preferably 0.35 or higher, more preferably 0.40 or higher, particularly preferably 0.45 or higher. By providing a surface layer having a large R value, insertion/elimination of ions between graphite layers can become easier, whereby quick charging property of the electrode material for a secondary battery can be improved. Here, the larger the R vale, the lower the crystallinity.

A graphite suitable for the surface layer is obtained by polymerizing an organic compound at a temperature of 200 to 400° C. and then treating it at a temperature of 1000 to 2700° C. When the temperature of the final heat treatment is too low, carbonization ends up incomplete and hydrogen and oxygen remaining in the compound may adversely affect battery characteristics. Therefore, the preferable temperature is 1000° C. or higher. If the treating temperature is too high, crystallization of the graphite excessively proceeds, which leads to decrease in charge characteristics. Therefore, the preferable temperature is 2700° C. or less. More preferred range is from 1000 to 2500° C., most preferably 1000 to 2300° C.

There is no limitation on the organic compound. Preferred examples include resins, resin precursors and monomers. In a case where a resin precursor or a monomer is used, it is preferable to polymerize the resin precursor or the monomer to prepare a resin. Examples of suitable organic compound include at least one compound selected from the group consisting of phenol resin, polyvinyl alcohol resin, furan resin, cellulose resin, polystyrene resin, polyimide resin and epoxy resin.

It is preferable that the heat treatment be carried out in a nonoxidizing atmosphere. Examples of nonoxidizing atmosphere include an atmosphere filled with an inert gas such as argon gas or nitrogen gas.

Moreover, in the present invention, it is preferable to conduct pulverization after the heat treatment. Since the composite particles are fusion-bonded with each other to thereby form agglomerates during the heat treatment, it is necessary to convert the graphite into fine particles so that it can be used as an electrode active material. With respect to the particle size of the thus microparticulated composite graphite according to the present invention, it is preferable, as described above, that 90% or more of the total particles have a particle size of 5 to 50 μm.

The BET specific surface area of the composite graphite can be in a range of 0.5 to 30 $m^2/g$, preferably 5 to 30 $m^2/g$, more preferably 10 to 25 $m^2/g$. The larger the specific surface area, the more the reaction of inserting lithium ions into the anode active material is increased. Accordingly, a larger specific surface area is considered to have a favorable influence on the charge characteristics.

There is no particular limitation on the proportions of the core material and the surface layer which constitute the composite graphite particles of the present invention. It is preferable that the whole surface of the core material be covered with the surface layer. The ratio of the surface layer against the core material is from 15 to 30 parts by mass against 100 parts by mass of the core material, in terms of the amount of an organic compound used for obtaining the composite graphite according to the present invention. If the amount of the organic compound is too small, satisfactory effect cannot be achieved. If the amount is too large, the battery capacity may decrease.

The composite graphite particles of the present invention may have vapor-grown carbon fiber attached onto the surface. A preferable average fiber diameter of vapor-grown carbon fiber usable here is in a range of 10 to 500 nm, more preferably 50 to 300 nm, still more preferably 70 to 200 nm, particularly preferably 100 to 180 nm. If the average fiber diameter is less than 10 nm, handleability decreases.

There is no particular limitation on the aspect ratio of vapor-grown carbon fiber. A preferred range of the aspect ratio is from 5 to 1000, more preferably 5 to 300, particularly preferably 5 to 200. If the aspect ratio is 5 or more, it can exhibit the function as a fibrous conductive material and if the aspect ratio is 1000 or less, handleability is good.

Vapor grown carbon fiber can be produced by a process in which an organic compound such as benzene, serving as a raw material, and an organo-transition metallic compound such as ferrocene, serving as a catalyst, are brought together into a high-temperature reaction furnace by using a carrier gas, to thereby cause pyrolysis in vapor phase. Examples of production method include a method in which thermally-decomposed carbon fiber is allowed to generate on a substrate (Japanese Laid-Open Patent Publication (kokai) No. 60-27700); a method in which thermally-decomposed carbon fiber is allowed to generate in floating state (Japanese Laid-Open Patent Publication (kokai) No. 60-54998); and a method in which thermally-decomposed carbon fiber is allowed to grow on the wall of a reaction furnace (Japanese Patent No. 2778434). The vapor-grown carbon fiber used in the present invention may be obtained by using these methods.

The thus-produced vapor-grown carbon fiber as is may be used as a raw material. The vapor grown carbon fiber right after the vapor growth, however, has thermal decomposition products derived from the raw material organic compound attached onto its surface, or its crystallinity of the fiber structure constituting the carbon fiber is unsatisfactory, in some cases. Therefore, for the purpose of removing impurities such as thermal decomposition products or improving the crystallinity for the carbon fiber, thermal treatment may be carried out in an inert gas atmosphere. In a case where impurities such as thermal decomposition products derived from the raw material organic compound are to be removed, it is preferable to conduct heat treatment in an inert gas atmosphere such as argon at a temperature of about 800 to 1500° C. In a case where the crystallinity of the carbon structure is to be improved, it is preferable to conduct heat treatment in an inert gas atmosphere such as argon at a temperature of about 2000 to 3000° C.

On this occasion, a boron compound such as boron carbide ($B_4C$), boron oxide($B_2O_3$), elemental boron, boric acid ($H_3BO_3$) and borate may be added as a graphitization catalyst. The amount of the boron compound to be added depends on chemical and physical properties of the boron compound and cannot be flatly defined. For example, in a case where boron carbide ($B_4C$) is used, the preferable amount is in a range of 0.05 to 10% by mass, more preferably 0.1 to 5% by mass, based on the amount of the vapor-grown carbon fiber.

Such a vapor-grown carbon fiber is commercially available, for example, as VGCF (registered trademark, product of SHOWA DENKO K. K.).

There is no particular limitation on the method for attaching (bonding) vapor-grown carbon fiber onto the surface layer. For example, vapor-grown carbon fiber can be attached onto the surface layer by adding an organic compound for the surface layer to a core material and mixing them together, then adding vapor-grown carbon fiber to the mixture to thereby attach the fiber to the core material via the organic compound, and subsequently heating the mixture to thereby allow the vapor-grown carbon fiber deposited on the surface layer by heat. A preferred blending amount of the vapor-grown carbon fiber is in a range of 0.1 to 20 parts by mass, more preferably 0.1 to 15 parts by mass, based on 100 parts by mass of the core material. By using 0.1 or more parts by mass of the vapor-grown carbon fiber, the surface of the surface layer can be broadly covered.

In the composite graphite particles of the present invention, the peak intensity ratio $I_{110}/I_{004}$ between the peak intensity ($I_{110}$) of face (110) and the peak intensity ($I_{004}$) of face (004) obtained by XRD measurement on the graphite crystal is 0.15 or higher when the graphite has been mixed with a binder and pressure-molded to an electrode density of 1.55 to 1.65 $g/cm^3$.

If this peak intensity ratio is less than 0.15, cycle characteristics significantly decreases when charge/discharge is repeated 50 times or more. The larger the peak intensity ratio $I_{110}/I_{004}$, the lower the crystal orientation in the electrode.

In a preferred embodiment of the composite graphite of the present invention, the interlayer distance d(002) is 0.337 nm or less and the crystallite diameter in the c-axis direction is 100 nm or more.

(Paste for Negative Electrode)

The paste for negative electrode of the present invention comprises the above composite graphite, binder and solvent. This paste for negative electrode can be obtained by kneading the above composite graphite, binder and solvent. The paste for negative electrode can be formed into a shape of sheet, pellet or the like.

Examples of binder include polyethylene, polypropylene, ethylenepropylene terpolymer, butadiene rubber, styrene butadiene rubber, butyl rubber, and polymer compounds having a high ion conductivity. Examples of polymer compounds having a high ion conductivity include vinylidene polyfloride, polyethylene oxide, polyepichlorohydrin, polyphosphazen, and polyacrylonitrile. A preferred blending ratio of the binder against the composite graphite is such that the binder is used in a range of 0.5 to 20 parts by mass based on 100 parts by mass of the composite graphite.

There is no particular limitation on the solvent. Examples thereof include N-methyl-2-pyrrolidone, dimethylformamide, isopropanol and water. In a case where water is used as a solvent in the binder, it is preferable to use a thickening agent together. The amount of the solvent is adjusted to have a suitable viscosity which makes a step of coating a collector with the paste easy.

(Negative Electrode)

The negative electrode of the present invention can be obtained by coating a collector with the paste for negative electrode, drying and pressure-molding it.

Examples of collector include foils and meshes of nickel or copper. There is no limitation on the method for coating the collector with the paste. The coating film thickness is generally in a range of 50 to 200 μm. If the thickness is too large, the negative electrode cannot fit a standardized battery vessel, in some cases.

Examples of pressure-molding method include methods using roll-pressure or press-pressure. A preferred pressure at the time of pressure-molding is from about 100 to 300 MPa (about 1 to 3 $t/cm^2$). A negative electrode obtained in this way is suitable for a lithium secondary battery.

(Lithium Secondary Battery)

The lithium secondary battery of the present invention comprises the negative electrode of the present invention as a constituent.

In the lithium secondary battery of the present invention, conventionally-employed materials can be used in the positive electrode. Examples of cathode active material include $LiNiO_2$, $LiCoO_2$ and $LiMn_2O_4$.

There is no limitation on the electrolytic solution used in the lithium secondary battery. Examples thereof include so-called organic electrolytic solutions obtained by dissolving lithium salt such as $LiClO_4$, $LiPF_6$, $LiAsF_6$, $LiBF_4$, $LiSO_3CF_3$, $CH_3SO_3Li$ and $CF_3SO_3Li$ in an non-aqueous solvent such as ethylene carbonate, diethyl carbonate, dimethyl carbonate, methylethyl carbonate, propylene carbonate, butylene carbonate, acetonitrile, propylonitrile, dimethoxyethane, tetrahydrofuran, and γ-butyrolactone, and solid or gelatinous so-called polymer electrolyte.

Also, it is preferable that a small amount of an additive which can show decomposition reaction at the time of the first battery charge be added to the electrolytic solution. Examples of additive include vinylene carbonate, biphenyl, and propane sultone. A preferred addition amount is in a range of 0.01 to 5% by mass.

In the lithium secondary battery of the present invention, a separator may be provided between the positive electrode and the negative electrode. Examples of separator include non-woven fabric, cloth and microporous film mainly consisting of polyolefin such as polyethylene and polypropylene and combination of these materials.

The lithium secondary battery using the composite graphite according to the present invention can be assembled by conventional method and be used in various uses. For example, the battery can be assembled by the method described in Japanese Patent Application Laid-Open No. 2006-260875, mounted and used in various types of apparatuses.

Examples of uses include lap-top personal computer, cell phone, wireless applications, electronic notebook, electronic meter, electronic key for automobile, power storage facility, electric power tool, radio control toy, digital camera, digital video, portable audio-visual equipment, cleaner, electric bicycle, electric motorcycle, electric-assist bicycle, automobile, airplane and ships. The battery can be used in any of these.

EXAMPLES

Hereinafter, the present invention is explained specifically by way of Examples and Comparative Examples. The present invention, however, is by no means limited by those Examples. With respect to properties of the graphite, the negative electrode and the battery, measurement and evaluations were conducted as follows.

(1) Specific Surface Area

The specific surface area was measured by BET method.

(2) Particle Size

Two microspatulafuls of graphite and 2 drops of nonionic surfactant (Triton-X) were added to 50 ml of water and the mixture was subjected to ultrasonic dispersion for 3 minutes. This dispersion liquid was placed into a laser-diffraction particle size analyzer manufactured by CILAS to measure the particle size distribution and work out a particle size range which encompassed 90% or more of the total particles.

(3) d Value and Lc

The interlayer distance of d(002) and the crystallite diameter in the c-axis direction were determined by powder x-ray diffraction according to Gakushin Method.

(4) Raman R Value

By using a Raman Spectrometer (NRS-3100) manufactured by JASCO Corporation, measurement was conducted under conditions of an excitation wavelength of 532 nm, an incident slit width of 200 μm, exposure time of 15 seconds, the number of accumulations of 2, and diffraction grating of 600/mm. The peak intensity ratio between the intensities around 1360 $cm^{-1}$ and around 1580 $cm^{-1}$ was calculated by the following formula to obtain a value R.

Value R=(peak intensity around 1360 $cm^{-1}$)/(peak intensity around 1580 $cm^{-1}$)     [Formula 1]

(4) $I_{004}$ and $I_{110}$

KF-polymer manufactured by KUREHA Corporation (L#9210; N-methyl-2-pyrrolidone solution of 10% by mass polyvinylidene difluoride) was added by small portions to graphite and kneaded, so that the solid content of the polyvinylidene difluoride became 5% by mass. Next, by using a non-bubbling kneader (NBK-1) manufactured by NISSEI Corporation, kneading was conducted at 500 rpm for 5 minutes to thereby obtain a paste. By using an automatic coating machine and a doctor blade with a clearance of 250 μm, the obtained paste was spread on a collector. The collector coated with the paste was placed on a hot plate heated at about 80° C. to thereby remove water content and then dried with a vacuum drier at 120° C. for 6 hours. After drying, the collector was pressure-molded by uniaxial press, so that the electrode density calculated from the total mass of the graphite and the binder divided by the volume became 1.60±0.05 $g/cm^3$, whereby a negative electrode was obtained.

The obtained negative electrode was cut into an appropriate size and attached to a glass cell for XRD measurement. The XRD spectra attributed to (004) face and (110) face were measured. From the respective peak intensities, the peak intensity ratio was calculated.

(5) Discharge Capacity of Battery

In a glove box whose inside was kept under a dry argon gas atmosphere of dew point −80° C. or less, the following operations were performed.

In a polypropylene-made cell (inner diameter of about 18 mm) having a screw-in lid, the negative electrode was sandwiched between separators (polypropylene-made microporous film (Cell Guard 2400; manufactured by Tonen Corporation)) to thereby form a laminate. Further, with a metal lithium foil (50 μm) for reference, a laminate was formed in the same manner. Electrolytic solution was injected into the above cell and the lid was closed, to thereby obtain a tripolar cell as a test sample. Here, the electrolytic solution had been prepared by dissolving electrolyte LiPF6 at a concentration of 1 M in a mixed solvent comprising ethylene carbonate and methylethyl carbonate at a volume ratio 2:3.

The obtained tripolar cell was charged at a constant current of 0.2 $mA/cm^2$ from the rest potential to 2 mV. Next, the cell was charged at a constant voltage of 2 mV and the charging was terminated at the time point when the current value decreased to 12.0 μA. After the charging, the battery was discharged at a constant current of 0.2 $mA/cm^2$ and cut off at a voltage of 1.5 V. The discharge capacity in this charge-discharge was evaluated.

(6) Cycle Characteristics of Battery

In a glove box whose inside was kept under a dry argon gas atmosphere of dew point −80° C. or less, the following operations were performed.

A positive electrode was prepared by spreading a positive electrode material, C-10, manufactured by NIPPON CHEMICAL WORKS CO., LTD. on an aluminum foil with 3% by mass of a binder (polyvinylidene difluoride: PVDF). In a SUS304-made cylindrical jacketing material, a spacer, a plate spring, the above negative electrode and the positive electrode were stacked with a separator (polypropylene-made microporous film "Celguard 2400" manufactured by Tonen Corporation) being present between them. On the laminate body, a cylindrical SUS304-made jacketing material serving as a top lid was placed. Next, this was immersed in an electrolytic solution to thereby conduct vacuum impregnation for 5 minutes. Subsequently, this was sealed by using a coin-cell caulking machine, to thereby obtain a coin-type cell for evaluation.

Using this coin cell, a constant-current constant-voltage charge-discharge test was conducted as follows.

The first and second charge-discharge cycles were conducted in the following manner. The cell was charged at a constant current of 0.2 $mA/cm^2$ from the rest potential to 4.2 V. Next, the cell was charged at a constant voltage of 4.2 V and the charging was terminated at the time point when the current value decreased to 25.4 μA. After the charging, the battery was discharged at a constant current of 0.2 $mA/cm^2$ and cut off at a voltage of 2.7 V.

The third charge-discharge cycle and cycles thereafter were conducted in the following manner. The cell was charged at a constant current of 1.0 $mA/cm^2$ (corresponding to 0.5 C) from the rest potential to 4.2 V. Next, the cell was charged at a constant voltage of 4.2 V and the charging was terminated at the time point when the current value decreased to 25.4 μA. After the charging, the battery was discharged at a constant current of 2.0 $mA/cm^2$ (corresponding to 1.0 C) and cut off at a voltage of 2.7 V.

The ratio of the discharge capacity at cycle 100 against the discharge capacity at cycle 3 was evaluated as "cycle capacity-retention rate".

(7) Charge Characteristics of Battery

Using the same tripolar cell as used in the above evaluation of discharge capacity, charge characteristics were evaluated.

The cell was charged at a constant current of 0.2 $mA/cm^2$ from the rest potential to 2 mV. Next, the cell was charged at a constant voltage of 2 mV and the charging was terminated at the time point when the current value decreased to 12.0 μA. After the charging, the battery was discharged at a constant current of 0.2 $mA/cm^2$ and cut off at a voltage of 1.5 V. This charge-discharge operation was conducted twice.

Next, the cell was charged at a constant current of 2 $mA/cm^2$ from the rest potential to 2 mV. Next, the cell was charged at a constant voltage of 2 mV and the charging was terminated at the time point when the current value decreased to 12.0 μA. The proportion of the capacity at the constant-current charge in the total charge-capacity was calculated and used in evaluation of charge characteristics. The larger the proportion, the better the charge characteristics.

EXAMPLE 1

To a core material consisting of a natural graphite having a d value of 0.3359 nm (manufactured by Nippon Graphite Industries, Ltd., spherical natural graphite LB-CG: average particle size: 15 to 25 μm), an ethanol solution of 60% by mass phenol resin precursor was added dropwise, so that the phenol resin became 20% by mass to the core material, and the mixture was kneaded. Subsequently, the precursor was polymerized at 200° C. to thereby cover the surface of the core material with phenol resin. Subsequently, heat treatment at 1300° C. was conducted in an argon gas atmosphere to thereby carbonize the phenol resin. Lastly, pulverization was conducted with a small-size blender to thereby obtain the composite graphite of the present invention. The evaluation results on this composite graphite are shown in Table 1.

EXAMPLE 2

To the same core material consisting of a spherical natural graphite LB-CG (manufactured by Nippon Graphite Industries, Ltd.) as used in Example 1, an ethanol solution of 60% by mass phenol resin precursor was added dropwise, so that the phenol resin became 20% by mass to the core material, and the mixture was kneaded. Subsequently, the precursor was polymerized at 200° C. to thereby cover the surface of the core material with phenol resin.

Subsequently, heat treatment at 2000° C. was conducted in an argon gas atmosphere to thereby carbonize the phenol resin. Lastly, pulverization was conducted with a small-size blender to thereby obtain the composite graphite of the present invention. The evaluation results on this composite graphite are shown in Table 1.

EXAMPLE 3

To the same core material consisting of a spherical natural graphite LB-CG (manufactured by Nippon Graphite Industries, Ltd.) as used in Example 1, an ethanol solution of 60% by mass phenol resin precursor was added dropwise, so that the phenol resin became 20% by mass to the core material, and the mixture was kneaded. Subsequently, vapor-grown carbon fiber (manufactured by SHOWA DENKO K.K., VGCF (registered trademark, average fiber diameter: 150 nm, average aspect ratio: 47) was added at 2% by mass to the core material and the mixture was further kneaded. Then, the precursor was polymerized at 200° C. to thereby cover the surface of the core material with phenol resin.

Subsequently, heat treatment at 1300° C. was conducted in an argon gas atmosphere to thereby carbonize the phenol resin. Lastly, pulverization was conducted with a small-size blender to thereby obtain the composite graphite of the present invention. The evaluation results on this composite graphite are shown in Table 1.

EXAMPLE 4

To the same core material consisting of a spherical natural graphite LB-CG (manufactured by Nippon Graphite Industries), Ltd.) as used in Example 1, an ethanol solution of 60% by mass phenol resin precursor was added dropwise, so that the phenol resin became 30% by mass to the core material, and the mixture was kneaded. Then, the precursor was polymerized at 200° C. to thereby cover the surface of the core material with phenol resin.

Subsequently, heat treatment at 1300° C. was conducted in an argon gas atmosphere to thereby carbonize the phenol resin. Lastly, pulverization was conducted with a small-size blender to thereby obtain the composite graphite of the present invention. The evaluation results on this composite graphite are shown in Table 1.

EXAMPLE 5

To the same core material consisting of a spherical natural graphite LB-CG (manufactured by Nippon Graphite Industries), Ltd.) as used in Example 1, an ethanol solution of 60% by mass phenol resin precursor was added dropwise, so that the phenol resin became 30% by mass to the core material, and the mixture was kneaded. Then, the precursor was polymerized at 200° C. to thereby cover the surface of the core material with phenol resin.

Subsequently, heat treatment at 2500° C. was conducted in an argon gas atmosphere to thereby carbonize the phenol resin. Lastly, pulverization was conducted with a small-size blender to thereby obtain the composite graphite of the present invention. The evaluation results on this composite graphite are shown in Table 1.

EXAMPLE 6

According to description in Japanese Patent Application Laid-Open No. 2004-2106341, an artificial graphite, SFG44, manufactured by Nippon Graphite Industries, Ltd.) was used as raw material and coagulation/spheroidization treatment was conducted by using a hybridizer manufactured by Nara Machinery Co., Ltd. To this powder, an ethanol solution of 60% by mass phenol resin precursor was added dropwise, so that the phenol resin became 15% by mass to the core material, and the mixture was kneaded. Next, heat treatment was conducted by first heating the mixture in the air to 270° C. over 5 hours and further keeping the temperature at 270° C. for 2 hours. Subsequently, heat treatment was performed in an argon gas atmosphere at 1300° C. to thereby obtain the composite graphite of the present invention. The evaluation results on this composite graphite are shown in Table 1.

EXAMPLE 7

According to description in Japanese Patent Application Laid-Open No. 2003-237303, a scaly natural graphite (Chinese product) was subjected to coagulation/spheroidization treatment by using a hybridizer manufactured by Nara Machinery Co., Ltd to thereby prepare a graphite material having a specific surface area of 5.0 m$^2$/g, each apparent density of 0.47 (in stationary method) and 0.72 (in tapping method), and an average particle size of 20 μm. To this graphite material, an ethanol solution of 60% by mass phenol resin precursor was added dropwise, so that the phenol resin became 20% by mass to the core material, and the mixture was kneaded. Next, the precursor was polymerized at 200° C. to thereby cover the surface of the core material.

Subsequently, heat treatment was performed in an argon gas atmosphere at 1300° C. to thereby carbonize the phenol resin. Lastly, pulverization was conducted with a small-size blender to thereby obtain the composite graphite of the present invention. The evaluation results on this composite graphite are shown in Table 1.

COMPARATIVE EXAMPLE 1

According to description in Japanese Patent Application Laid-Open No. 2003-142092, graphite particles were prepared by the following procedures.

A commercially available coal-based pitch was subjected to heat treatment at 500° C. in nitrogen gas for 36 hours to thereby obtain a mesophase pitch. This was pulverized to obtain fine particles having an average particle size of 25 μm.

Next, a commercially available coal-based pitch was subjected to heat treatment at 450° C. for 12 hours to thereby obtain a mesophase pitch having a softening point of 360° C. This was pulverized to obtain fine particles having an average particle size of 25 μm. Then, the pitch was made infusible through heat treatment at 300° C. in the air.

The above two kinds of powdery materials were mixed with each other at a blending ratio of 1 to 3, and the mixture was subjected to heat treatment at 1000° C. in a nitrogen atmosphere. Subsequently, graphitization treatment was performed in a small-size graphitization furnace at 3000° C., to thereby obtain a graphite material. The evaluation results on the obtained graphite are shown in Table 1.

Although the obtained graphite material showed a high battery capacitance and good cycle characteristics, its charge characteristics, which was less than 40, was evaluated as unsatisfactory.

COMPARATIVE EXAMPLE 2

According to description in Japanese Patent Application Laid-Open No. 2003-237303, graphite particles were prepared by the following procedures. The same scaly natural graphite (Chinese product) as used in Example 7 was subjected to coagulation/spheroidization treatment by using a hybridizer manufactured by Nara Machinery Co., Ltd to thereby prepare a graphite material having a specific surface area of 5.0 m$^2$/g, each apparent density of 0.47 (in stationary method) and 0.72 (in tapping method), and an average particle size of 20 μm. The evaluation results on the obtained graphite are shown in Table 1.

COMPARATIVE EXAMPLE 3

According to description in Japanese Patent No. 3193342, graphite particles were prepared by the following procedures. An artificial graphite, SFG44, manufactured by Nippon Graphite Industries, Ltd.), was used as raw material and coagulation/spheroidization treatment was conducted by using a hybridizer manufactured by Nara Machinery Co., Ltd. to thereby obtain a sphericity of 0.941. Next, a commercially-available coal-based pitch was added at 15% by mass to the surface of the particles and the mixture was heated to 500° C. while kneading. Subsequently, heat treatment was conducted in an argon atmosphere at 1500° C. and the resultant was pulverized by using a small-size blender to thereby obtain a graphite material. The evaluation results on the obtained graphite are shown in Table 1.

COMPARATIVE EXAMPLE 4

According to description in Japanese Patent Application Laid-Open No. 2004-210634, graphite particles were prepared by the following procedures. An artificial graphite, SFG44, manufactured by Nippon Graphite Industries, Ltd.), was used as raw material and coagulation/spheroidization treatment was conducted by using a hybridizer manufactured by Nara Machinery Co., Ltd. To this powder, an ethanol solution of 60% by mass phenol resin was added, so that the phenol resin as solid became 10% by mass, and the mixture was kneaded. Next, heat treatment was conducted by first heating the mixture in the air to 270° C. over 5 hours and further keeping the temperature at 270° C. for 2 hours. Subsequently, heat treatment was performed in a nitrogen atmosphere at 1000° C. and then in an argon gas atmosphere at 3000° C. to thereby obtain a graphite material. The evaluation results on this composite graphite are shown in Table 1.

COMPARATIVE EXAMPLE 5

In the same manner as in Examples 1 and 2, to a natural spherical graphite, LB-CG, manufactured by Nippon Graphite Industries, Ltd., an ethanol solution of 60% by mass phenol resin precursor was added dropwise, so that the phenol resin became 20% by mass to the core material, and the mixture was kneaded. Subsequently, the precursor was polymerized at 200° C. to thereby cover the surface of the core material with phenol resin.

Subsequently, heat treatment at 2900° C. was conducted in an argon gas atmosphere to thereby carbonize the phenol resin. Lastly, pulverization was conducted with a small-size blender to thereby obtain the composite graphite of the present invention. The evaluation results on this composite graphite are shown in Table 1.

COMPARATIVE EXAMPLE 6

By using a natural spherical graphite, LB-CG, manufactured by Nippon Graphite Industries, Ltd. which was used in Examples 1 to 5 and Comparative Example 5 as the core material, various evaluations were conducted. The evaluation results are shown in Table 1.

COMPARATIVE EXAMPLE 7

According to description in Japanese Patent Application Laid-Open No. 2004-210634, in the same manner as in Example 6 and Comparative Example 4, an artificial graphite, SFG44, manufactured by Nippon Graphite Industries, Ltd., was used as raw material and coagulation/spheroidization treatment was conducted by using a hybridizer manufactured by Nara Machinery Co., Ltd. The evaluation results on this composite graphite are shown in Table 1.

TABLE 1

| | | | Particle properties | | | | | Battery characteristics | | | |
|---|---|---|---|---|---|---|---|---|---|---|---|
| | Surface-covering amount (mass %) | Heat-treatment temperature (° C.) | Specific Surface Area (m$^2$/g) | Particle Size range (μm) | d(002) (nm) | Lc (nm) | Raman R value | Crystal Orientation I(110)/I(104) | Discharge capacity (mAh/g) | Charge characteristics (%) | Cycle Capacity-retention ratio (%) |
| Example 1 | 20 | 1300 | 21 | 10-40 | 0.3365 | >100 | 0.54 | 0.21 | 350 | 45 | 73 |
| Example 2 | 20 | 2000 | 12 | 8-35 | 0.3364 | >100 | 0.40 | 0.19 | 350 | 53 | 75 |
| Example 3 | 15 | 1300 | 22 | 8-41 | 0.3365 | >100 | 0.51 | 0.21 | 350 | 55 | 82 |
| Example 4 | 30 | 1300 | 21 | 8-43 | 0.3365 | >100 | 0.52 | 0.22 | 350 | 56 | 74 |

TABLE 1-continued

| | Surface-covering amount (mass %) | Heat-treatment temperature (° C.) | Particle properties | | | | | Battery characteristics | | |
| --- | --- | --- | --- | --- | --- | --- | --- | --- | --- | --- |
| | | | Specific Surface Area (m²/g) | Particle Size range (μm) | d(002) (nm) | Lc (nm) | Raman R value | Crystal Orientation I(110)/I(104) | Discharge capacity (mAh/g) | Charge characteristics (%) | Cycle Capacity-retention ratio (%) |
| Example 5 | 30 | 2500 | 16 | 8-43 | 0.3364 | >100 | 0.40 | 0.20 | 350 | 54 | 74 |
| Example 6 | 15 | 1300 | 25 | 10-40 | 0.3366 | >100 | 0.45 | 0.16 | 330 | 51 | 69 |
| Example 7 | 20 | 1300 | 23 | 10-41 | 0.3364 | >100 | 0.50 | 0.19 | 355 | 52 | 72 |
| Comparative Example 1 | 0 | 3000 | 0.9 | 6-26 | 0.3363 | 90 | 0.13 | 0.20 | 330 | 11 | 71 |
| Comparative Example 2 | 0 | — | 5.0 | 9-39 | 0.3364 | >100 | 0.32 | 0.02 | 350 | 23 | 52 |
| Comparative Example 3 | 15 | 1500 | 3.9 | 8-28 | 0.3357 | >100 | 0.30 | 0.08 | 360 | 15 | 32 |
| Comparative Example 4 | 10 | 3000 | 8 | 10-35 | 0.3364 | >100 | 0.35 | 0.06 | 350 | 18 | 45 |
| Comparative Example 5 | 20 | 2900 | 4 | 7-42 | 0.3365 | >100 | 0.06 | 0.09 | 355 | 20 | 70 |
| Comparative Example 6 | 0 | — | 5.5 | 6-38 | 0.3355 | >100 | 0.04 | 0.02 | 360 | 10 | 23 |
| Comparative Example 7 | 0 | — | 9.8 | 9-45 | 0.3366 | 80 | 0.05 | 0.10 | 320 | 12 | 26 |

As seen from the above results, the composite graphite particles of the present invention achieves $I_{110}/I_{004}$ of 0.15 or more when the d value of the core material graphite is 0.337 nm or less, the R value of the surface layer graphite is 0.3 or more, and a binder is used when the cell is charged with the material. The results show that the composite graphite materials having such a property (Examples 1 to 7) have a high initial discharge capacity, a cycle capacity-retention ratio of 70% or more at cycle 100 and charge characteristics of 40% or more. Among these Examples, the composite graphite having vapor-grown carbon fiber attached on its surface (Example 3) obtained high values in both charge characteristics and cycle capacity-retention ratio.

On the other hand, as shown in Comparative Examples 1 to 4, although all graphite materials obtained in conventional methods have large discharge capacity, none of the materials obtained good cycle characteristics and charge characteristics. In Comparative Example 5 where the graphite was produced by the same procedures as in Examples 1 and 2, since the temperature employed for thermally treating the surface layer is outside the range of 1000 to 2700° C., the value of R value and crystal orientation are low, the graphite failed to obtain good charge characteristics and high cycle capacity retention ratio. Moreover, in Comparative Examples 6 and 7 where surface layer was not formed, the graphite materials failed to obtain good charge characteristics and high cycle capacity retention ratio.

The invention claimed is:

1. Composite graphite particles, comprising a core material consisting of graphite having an interlayer distance d(002) of 0.337 nm or less, a surface layer consisting of graphite in which the intensity ratio $I_D/I_G$ (R value) between the peak intensity ($I_D$) in a range of 1300 to 1400 cm$^{-1}$ and the peak intensity ($I_G$) in a range of 1580 to 1620 cm$^{-1}$ as measured by Raman scattering spectroscopy is 0.4 or higher, wherein the peak intensity ratio $I_{110}/I_{004}$ between the peak intensity ($I_{110}$) of face (110) and the peak intensity ($I_{004}$) of face (004) obtained by XRD measurement on the graphite crystal is 0.15 or higher when the graphite has been mixed with a binder and pressure-molded to a density of 1.55 to 1.65 g/cm$^3$, and vapor-grown carbon fiber attached on the surface layer via carbon, wherein the vapor grown carbon fiber is attached on the surface layer via carbon by a process of mixing the vapor grown carbon fiber with an organic compound, polymerizing the organic compound in the mixture and then carbonizing the organic compound to form the surface layer, wherein the surface layer graphite is obtained by thermally treating the organic compound at a temperature of 1000 to 2700° C., wherein the organic compound is at least one selected from a group consisting of phenol resin, polyvinylalcohol resin, furan resin, cellulose resin, polystyrene resin, polyimide resin and epoxy resin, wherein the coating amount of the organic compound serving as raw material for the surface layer is in a range of 15 to 30% by mass based on the core material, and wherein the R value of the core material is smaller than that of the surface layer graphite.

2. The composite graphite particles according to claim 1, wherein the crystallite diameter in the c-axis direction Lc of the core material graphite is 100 nm or more.

3. The composite graphite particles according to claim 1, wherein the core material graphite is a natural graphite.

4. The composite graphite particles according to claim 1, wherein in particle size distribution measurement by laser diffraction method, the particle size of 90% or more of the total core material is within a range of 5 to 50 μm.

5. The composite graphite particles according to claim 1, wherein the BET specific surface area is in a range of 0.5 to 30 m$^2$/g.

6. The composite graphite particles according to claim 1, wherein the interlayer distance d(002) is 0.337 nm or less and the crystallite diameter in the c-axis direction Lc is 100 nm or more.

7. The composite graphite particles according to claim 1, wherein in particle size distribution measurement by laser diffraction method, the particle size of 90% or more of the particles is within a range of 5 to 50 μm.

8. A method for producing the composite graphite particles as claimed in claim 1, comprising a step of allowing the organic compound to attach to the surface of the core material consisting of a graphite having an interlayer distance d(002) of 0.337 nm or less, a step of polymerizing the organic compound at 200 to 400° C. and a step of conducting a thermal treatment at a temperature of 1000 to 2700° C.

9. A paste for negative electrode, comprising the composite graphite particles as claimed in claim 1, a binder and a solvent.

10. A negative electrode, wich is obtained by spreading the paste for negative electrode as claimed in claim 9 on a collecter, drying the spread paste and pressure-molding the dried paste.

11. A lithium secondary battery comprising the negative electrode as claimed in claim 10 as a constituent.

12. The lithium secondary battery according to claim 11, comprising a nonaqueous electrolytic solution and/or nonaqueous polymer electrolyte, wherein the nonaqueous electrolytic solution and/or nonaqueous polymer contains at least one nonqueous solvent selected from a group consisting of ethylene carbonate, diethylene carbonate, dimethyl carbonate, methyl ethyl carbonate, propylene carbonate, butylene carbonate, γ-butyrolactone and vinylene carbonate.

\* \* \* \* \*